(12) United States Patent
Araya et al.

(10) Patent No.: US 7,969,653 B2
(45) Date of Patent: Jun. 28, 2011

(54) LASER MICROSCOPE AND CONTROL METHOD FOR THE SAME

(75) Inventors: Akinori Araya, Yokohama (JP); Tatsuo Nakata, Hino (JP); Makio Ueno, Nagano (JP)

(73) Assignee: Olympus Corporation, Tokyo (JP)

( * ) Notice: Subject to any disclaimer, the term of this patent is extended or adjusted under 35 U.S.C. 154(b) by 587 days.

(21) Appl. No.: 12/002,508

(22) Filed: Dec. 17, 2007

(65) Prior Publication Data

US 2008/0151366 A1   Jun. 26, 2008

(30) Foreign Application Priority Data

Dec. 25, 2006   (JP) .................................. 2006-347892

(51) Int. Cl.
*G02B 21/06* (2006.01)
*G02B 21/00* (2006.01)
(52) U.S. Cl. ................. 359/388; 359/368; 359/385
(58) Field of Classification Search ........... 359/368–390
See application file for complete search history.

(56) References Cited

U.S. PATENT DOCUMENTS

| | | | | |
|---|---|---|---|---|
| 3,429,641 A | * | 2/1969 | Fowler | 352/198 |
| 3,531,179 A | * | 9/1970 | Sliker et al. | 359/251 |
| 3,938,878 A | * | 2/1976 | Fox | 359/251 |
| 4,428,873 A | * | 1/1984 | Murayama et al. | 252/583 |
| 5,451,977 A | | 9/1995 | Kusuda et al. | |
| 5,936,764 A | | 8/1999 | Kobayashi | |
| 6,859,467 B2 | * | 2/2005 | Adams et al. | 372/12 |
| 2004/0196549 A1 | * | 10/2004 | Aono | 359/388 |
| 2005/0068645 A1 | | 3/2005 | Nagaeda | |

FOREIGN PATENT DOCUMENTS

| | | | | |
|---|---|---|---|---|
| JP | 60-181718 | * | 9/1985 | 359/385 |
| JP | 8-327936 A | | 12/1996 | |
| JP | 10-288798 A | | 10/1998 | |
| JP | 2005-55745 | * | 3/2005 | 359/385 |
| WO | WO 03/046613 A2 | | 6/2003 | |
| WO | WO-03/046897 | * | 6/2003 | 359/385 |

OTHER PUBLICATIONS

European Patent Office Communication dated Jun. 6, 2009 (4 pages), issued in counterpart European Application Serial No. 07 024 561.8.
K. Nakamura et al; Applied Physics Letters 89, 2006; Wide-Angle, Low-Voltage Electro-Optic Beam Deflection Based on Space-Charge-Controlled Mode of Electrical Conduction . . . ; 3 pages.
Extended European Search Report dated Apr. 25, 2008, issued in a counterpart European Application.

* cited by examiner

*Primary Examiner* — Thong Nguyen
(74) *Attorney, Agent, or Firm* — Holtz, Holtz, Goodman & Chick, PC

(57) ABSTRACT

It is possible to achieve a required field number and numerical aperture for microscope observation at a scanning speed equal to video-rate or higher and also to change the scanning speed with a simple configuration. The invention provides a laser microscope including a laser light source; a scanning unit configured to scan a specimen with laser light emitted from the laser light source; and an objective lens configured to focus the laser light scanned by the scanning unit on the specimen. The scanning unit is provided with an electro-optical deflecting element including an electro-optical crystal in which a refractive index gradient is induced by injecting electric current.

21 Claims, 9 Drawing Sheets

LASER MICROSCOPE AND CONTROL METHOD FOR THE SAME

BACKGROUND OF THE INVENTION

1. Field of the Invention

The present invention relates to laser microscopes and to a method for controlling the same.

This application is based on Japanese Patent Application No. 2006-347892, the content of which is incorporated herein by reference.

2. Description of Related Art

A known laser microscope using a point scanning method employs a galvanometer mirror, an acousto-optic device, or an electro-optical element as a scanning unit.

Although the laser microscope using a galvanometer mirror can ensure a sufficient deflection angle of laser light, there is a problem in that the required video-rate cannot be realized because its scanning speed is slow.

There are known light scanning devices capable of scanning laser light at the required video rate using an acousto-optic device (for example, see Japanese Unexamined Patent Application, Publication No. HEI-8-327936), and using an electro-optical element (for example, see Japanese Unexamined Patent Application, Publication No. HEI-10-288798).

However, when using the acousto-optic device as a scanning unit, the deflection angle of the laser light is only about ±1°. When satisfying the numerical aperture and field number in a scanning optical system, the required deflection angle of the light is generally in an inversely proportional relationship to the beam diameter of the light. Accordingly, in order to ensure sufficient field number and numerical aperture using the acousto-optic device, the beam diameter of the laser light must be 10 times larger than when using a galvanometer mirror. Therefore, an extremely large acousto-optic device crystal is required to realize incident laser light having such a large beam diameter.

When the beam diameter of the laser light to be made incident on the acousto-optic device is large, the delay effect of an acoustic wave passing through the acousto-optic device crystal becomes large. Accordingly, a cylindrical lens effect occurs whereby the laser light emitted from the acousto-optic device crystal is wider in the uniaxial direction, resulting in the generation of an astigmatic difference when focusing the laser light with an objective lens, which causes low resolution.

In Japanese Unexamined Patent Application, Publication No. HEI-8-327936, a cylindrical lens is disposed at the rear side of the acousto-optic device to prevent the laser light from becoming wide due to the delay of the sound wave passing through the acousto-optic device. However, the width of the laser light emitted from the acousto-optic device varies according to the scanning speed of the laser light from the acousto-optic device; therefore the cylindrical lens must be changed every time the scanning speed is changed.

Even when the electro-optical element is used as the scanning unit, the deflection angle is only about 0.2°. Accordingly, Japanese Unexamined Patent Application, Publication No. HEI-10-288798 discloses widening the deflection angle by providing a plurality pairs of counter electrodes which are provided in the electro-optical element and which are arranged in series in the optical-axis direction.

However, because the thickness of the electro-optical element crystal disclosed in this publication is extremely small, i.e., about 200 μm, the beam diameter of the laser light that can be incident on it is about 150 μm at most. In order to ensure sufficient field number and numerical aperture using such an extremely small beam diameter, it is necessary to realize a deflection angle equal to 200° or more at the exit of the electro-optical element.

BRIEF SUMMARY OF THE INVENTION

The present invention provides a laser microscope that can achieve a required field number and numerical aperture for microscope observation at a scanning speed equal to video rate or higher and that is capable of changing the scanning speed with a simple configuration, and a control method for the same.

The present invention provides the following solutions.

A first aspect of the present invention is a laser microscope comprising a laser light source; a scanning unit configured to scan a specimen with laser light emitted from the laser light source; and an objective lens configured to focus the laser light scanned by the scanning unit on the specimen, wherein the scanning unit is provided with an electro-optical deflecting element including an electro-optical crystal in which a refractive index gradient is induced by injecting electric current.

According to a first aspect of the present invention, a wider deflection angle can be obtained with a low voltage because the electro-optical crystal in which a refractive index gradient is induced by injecting electric current is provided. In other words, with this electro-optical deflecting element, the laser light incident on the electro-optical crystal changes its propagation direction due to refraction caused by the refractive index distribution generated by applying an electric field, and this change accumulates as the light advances through the crystal. In this way, it is possible to obtain a wide deflection angle in the direction of the electric field applied to the electro-optical crystal.

When the electric field is not applied, the laser light passes straight through the crystal, and the deflection angle thereof can be freely controlled according to the intensity of the electric field to be applied. In addition, because a refractive index distribution is produced by applying the electric field, instead of using a sound wave (elastic wave) such as that produced by an acousto-optic device, the responsiveness is much higher than that of the acousto-optic device; therefore, the orientation of the light can be controlled at higher speed than when using the acousto-optic device. Because a wider deflection angle can be obtained with low voltage, it is possible to obtain a practical deflection angle with a practical voltage even when the distance between crystal electrodes is large.

Accordingly, high-speed scanning at video rate or more can be realized by using the electro-optical deflecting element having such an electro-optical crystal as the scanning unit, and the required field number and numerical aperture for microscope observation can be achieved by ensuring sufficient beam diameter and deflection angle of the laser light to be scanned. In addition, even when the scanning speed is changed, the laser light does not widen; therefore, cylindrical lenses, switching mechanisms, and the like are not required. Accordingly, it is possible to minimize the size and cost of the apparatus.

In the first aspect described above, the electro-optical deflecting element may have a Kerr constant equal to $5 \times 10^{-15}$ $m^2/V^2$ or more.

In the first aspect described above, the electro-optical crystal may be $KTa_{1-x}Nb_xO_3$.

In the first aspect described above, the laser light may be made incident on the electro-optical deflecting element so that a polarization direction of the laser light matches a predetermined direction that is effective in deflection of the laser light by the electro-optical deflecting element.

Because the electro-optical deflecting element, in which the refractive index gradient is induced by injecting electric current, has polarization dependency, it is possible to efficiently deflect the laser light and to ensure a desired deflection angle by causing the laser light to be incident on the electro-optical deflecting element in a manner such that the polarization direction of the laser light matches a predetermined direction that is effective in its deflection by the electro-optical deflecting element.

In the first aspect described above, the laser light may be light-stimulus laser light for the specimen, or laser light for laser trapping.

The electro-optical deflecting element, in which the refractive index gradient is induced by injecting electric current, has wavelength dependency. Accordingly, it is not suitable for confocal observation where fluorescence produced in a specimen, having a different wavelength from that of the laser light, is detected via electro-optical deflecting elements. Because light-stimulus laser light and laser light for laser trapping do not need to be returned to the electro-optical deflecting element, the laser light can be moved at high speed on the specimen without deteriorating the optical performance.

In the first aspect described above, the laser light may be used for observation of reflected light at the specimen.

Because the reflected laser light from the specimen is the laser light irradiating the specimen, the wavelength does not vary, and the laser light can follow the same optical path even passing through the electro-optical deflecting element. Accordingly, in reflection observation, the laser light can be scanned at high speed on the specimen without deteriorating the optical performance.

In the first aspect described above, the laser light may be ultrashort pulsed laser light producing a multiphoton-excitation effect in the specimen.

With ultrashort pulsed laser light, fluorescence can be produced only at a specific position in the depth direction of the specimen due to the multiphoton-excitation effect. Accordingly, it is possible to detect and acquire a clear multiphoton fluorescence image without passing the light through the electro-optical deflecting element.

In the configuration described above, the laser microscope may further include a control unit configured to switch a deflection direction of the laser light by the electro-optical deflecting element and to adjust an irradiation time of the laser light to a target irradiation position and an irradiation time of the laser light to outside of the target irradiation position.

With this configuration, by operating the control unit to adjust the ratio between the irradiation time of the laser light to the target irradiation position and the irradiation time of the laser light to outside of the target irradiation position, the power of the laser light irradiating the target irradiation position can be adjusted without using a separate light modulator.

In the first aspect described above, the scanning unit may include two electro-optical deflecting elements arranged in the optical-axis direction so that scanning directions thereof differ by 90°; and a polarization rotation unit configured to rotate the polarization direction of the laser light by 90° is provided between the electro-optical deflecting elements.

The laser light can be two-dimensionally scanned on the specimen by making the laser light pass through the two electro-optical deflecting elements arranged in the optical-axis direction so that the deflection directions thereof differ by 90° to deflect the light in two mutually orthogonal directions. In this case, the laser light is made incident on the first electro-optical deflecting element so that the polarization direction matches a predetermined direction that is effective in deflecting the laser light. By passing the emitted laser light deflected in one direction by the first electro-optical deflecting element through the polarization rotation unit, it is made incident on the next electro-optical deflecting element in a manner such that the polarization direction matches a predetermined direction that is effective in its deflection. Therefore, the laser light can be efficiently deflected in two mutually orthogonal directions and the desired deflection angle can be ensured.

In the configuration described above, the polarization rotation unit may be formed of an achromatic half-wave plate.

With this configuration, the polarization direction of the laser light can be easily rotated by 90°. In addition, the polarization direction of the laser light can be rotated in a wide wavelength band with a high degree of efficiency.

In the configuration described above, the two electro-optical deflecting elements may be disposed close to each other in the optical-axis direction.

In this case, a conjugate position with respect to a pupil of the objective lens preferably exists between the two electro-optical deflecting elements.

With this configuration, the movement in the laser light at the pupil position of the objective lens can be minimized.

In the configuration described above, relay lenses configured to relay the pupil position of the objective lens to a deflection center position of these two electro-optical deflecting elements may be disposed between the two electro-optical deflecting elements.

With this configuration, by relaying the pupil position of the objective lens to the deflection center position of these two electro-optical deflecting elements with the relay lenses, it is possible to minimize the movement of the laser light at the pupil position of the objective lens even when the length of the electro-optical deflecting elements in the axial direction increases.

In the first aspect described above, the scanning unit may be formed by arranging, in the optical axis direction, the electro-optical deflecting element and another scanning device in which the scanning direction thereof differs by 90° relative to the deflection direction of the electro-optical deflecting element.

With this configuration, by using the electro-optical deflecting elements at the high-speed scanning side, and by using another scanning device at the low-speed scanning side, the laser light can be two-dimensionally scanned using the raster scanning method.

In the configuration described above, the other scanning device may be a galvanometer mirror or an acousto-optic deflecting device.

With this configuration, it is possible to configure the two-dimensional scanning unit at low cost by using the galvanometer mirror or the acousto-optic device at the low-speed scanning side.

In the first aspect described above, the laser microscope may further include a wavelength switching unit configured to switch a wavelength of the laser light emitted from the laser light source; and a control unit configured to adjust a voltage applied to the electro-optical deflecting element according to the wavelength switched by the wavelength switching unit.

With this configuration, even when the wavelength of the laser light is switched by operating the wavelength switching unit, the control unit is operated in response thereto to adjust the voltage applied to the electro-optical deflecting elements, and therefore it is possible to prevent a change in the deflection direction of the laser light emitted from the electro-optical deflecting elements.

In the configuration described above, the control unit may apply to the electro-optical deflecting element a voltage according to the following expression:

$$V=(n_{ref}/n)^{3/2} \times V_{ref}$$

where $n_{ref}$ is the required refractive index for laser light of a reference wavelength, $V_{ref}$ is the voltage at that time, n is the required refractive index for the laser light of a wavelength to be controlled, and V is the voltage at that time.

With this configuration, even when the wavelength of the incident laser light is switched, it is possible to scan the same scanning range without changing the deflection direction of the laser light emitted from the electro-optical deflecting elements.

In the first aspect described above, the laser microscope may further include a control unit configured to control a deflection direction of the laser light from the electro-optical deflecting element, wherein the control unit controls the electro-optical deflecting element with a voltage biased in one direction.

With this configuration, in the characteristic of the electro-optical deflecting elements, it is possible to use a region where the change in deflection angle relative to the change in the voltage to be applied is large, thus allowing the desired scanning range to be scanned with a smaller change in voltage.

In the first aspect described above, the laser microscope may further include a light modulating unit configured to modulate the laser light.

With this configuration, by operating the light modulating unit, it is possible to perform intensity modulation, on/off modulation, or wavelength modulation of the laser light.

A second aspect of the present invention is a control method for a laser microscope in which laser light is scanned, on a specimen, by an electro-optical deflecting element including an electro-optical crystal in which a refractive index gradient is induced by injecting electric current, the control method comprising controlling the electro-optical deflecting element by a voltage biased in one direction.

According to the second aspect of the present invention, by applying the voltage to the electro-optical crystal of the electro-optical deflecting element, and by inducing the refractive index gradient in the electro-optical crystal by injecting electric current, the laser light passing therethrough can be deflected in one direction. In this case, by applying the bias voltage in one direction to the electro-optical deflecting element, it is possible to use, in the characteristic of the electro-optical crystal, a region where the change in deflection angle relative to the change in the voltage to be applied is large, thus allowing the desired scanning range to be scanned with a smaller change in voltage.

A third aspect of the present invention is a control method for a laser microscope in which laser light is scanned, on a specimen, by an electro-optical deflecting element including an electro-optical crystal in which a refractive index gradient is induced by injecting electric current, the control method comprising changing a voltage applied to the electro-optical deflecting element according to a wavelength of laser light incident on the electro-optical deflecting element.

According to the third aspect of the present invention, even when the wavelength of the laser light is switched, by adjusting the voltage applied to the electro-optical deflecting element in response thereto, it is possible to prevent a change in the deflection direction of the laser light emitted from the electro-optical deflecting element.

In the third aspect described above, a voltage according to the following expression may be applied to the electro-optical deflecting element:

$$V=(n_{ref}/n)^{3/2} \times V_{ref}$$

where $n_{ref}$ is the required refractive index for the laser light of a reference wavelength, $V_{ref}$ is the voltage at that time, n is the required refractive index for the laser light of a wavelength to be controlled, and V is the voltage at that time.

With this configuration, even when the wavelength of the incident laser light is switched, it is possible to scan the same scanning range without changing the deflection direction of the laser light emitted from the electro-optical deflecting element.

A fourth aspect of the present invention is a control method for a laser microscope in which ultrashort pulsed laser light for generating a multiphoton-excitation effect is scanned, on a specimen, by an electro-optical deflecting element including an electro-optical crystal in which a refractive index gradient is induced by injecting electric current, the control method comprising changing a deflection angle of the ultrashort pulsed laser light by the electro-optical deflecting element in synchronization with successive pulses of the ultrashort pulsed laser light.

According to the fourth aspect of the present invention, the spot of laser light can be moved to a separate position on the specimen without trailing the spot.

In the fourth aspect described above, the change of the deflection angle of the ultrashort pulsed laser light by the electro-optical deflecting element may be completed between successive pulses of the ultrashort pulsed laser light.

With this configuration, it is possible to irradiate the specimen with laser light having a constant intensity at each of the spot positions.

DETAILED DESCRIPTION OF THE INVENTION

A laser microscope 1 and a control method thereof according to an embodiment of the present invention will be described below with reference to FIGS. 1 and 2.

Figure 1:
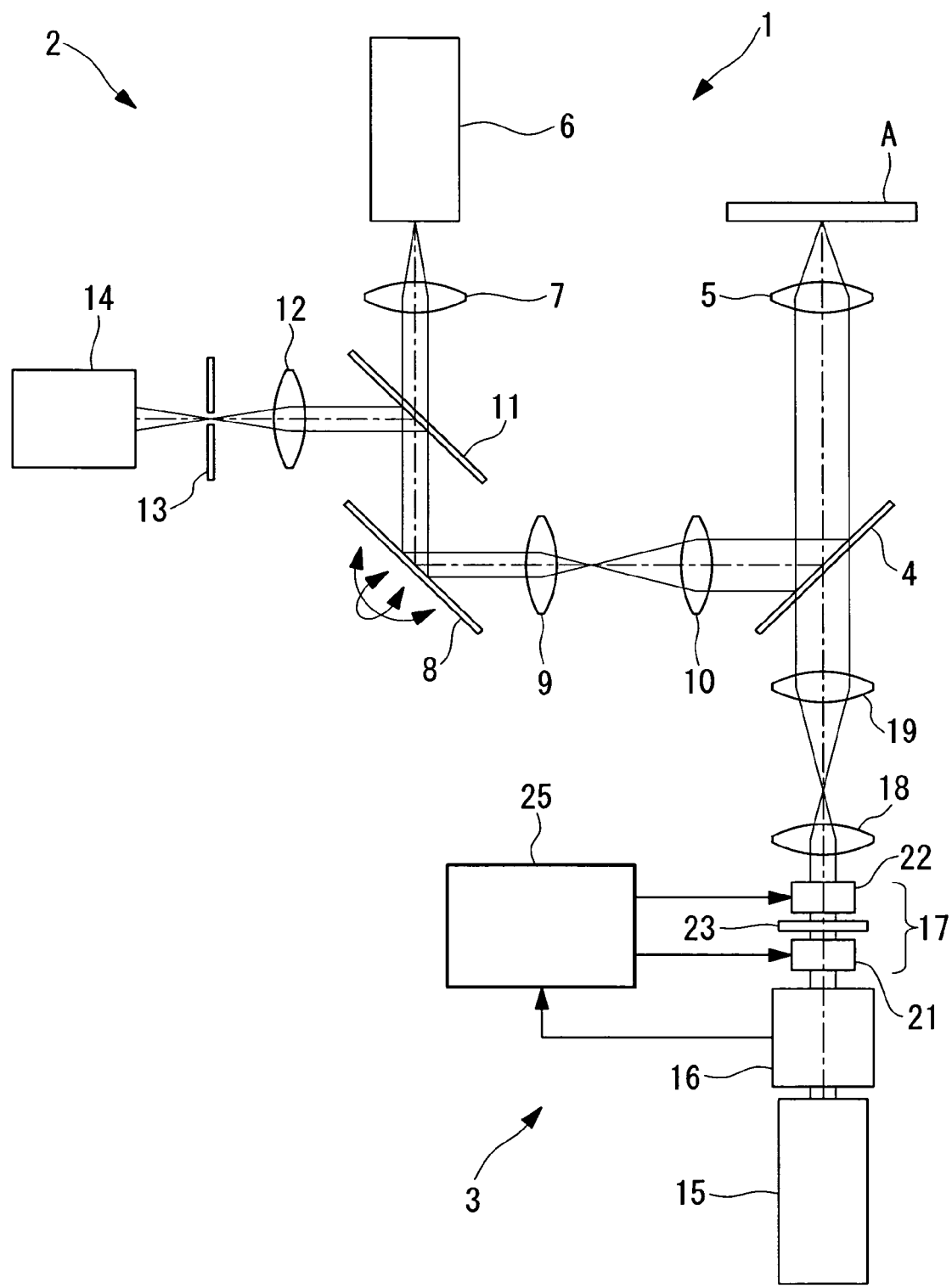
FIG. 1 is a schematic diagram showing the overall configuration of a laser microscope according to an embodiment of the present invention.

As shown in FIG. 1, the laser microscope 1 according to this embodiment includes an observation optical system 2, a light-stimulus optical system 3, a dichroic mirror 4 for combining optical axes of these optical systems 2 and 3, and an objective lens 5 for irradiating a specimen A with laser light and collecting fluorescence emitted from the specimen A due to irradiation with the laser light.

The observation optical system 2 includes an observation laser light source 6 for emitting the laser light, a collimator lens 7 for converting the laser light from the laser light source 6 to substantially collimated light, a scanning unit 8 for two-dimensionally scanning the laser light substantially collimated by the collimator lens 7, a pupil-projection lens 9 for focusing the laser light scanned by the scanning unit 8 to form an intermediate image, and an image-forming lens 10 for collecting the laser light forming the intermediate image and converting it to substantially collimated light.

The scanning unit 8 is a so-called proximity galvanometer mirror, for example, formed of two galvanometer mirrors that can be rocked back and forth in two mutually orthogonal directions and that are disposed in close proximity.

The observation optical system 2 also includes a dichroic mirror 11 for splitting off from the optical path of the laser light the fluorescence which is collected by the objective lens 5 and which returns via the dichroic mirror 4, the image-forming lens 10, the pupil-projection lens 9, and the scanning unit 8; a focusing lens 12 for focusing the split-off fluorescence; a confocal pinhole 13 disposed in the vicinity of a focal position of the focusing lens 12; and a light detector 14 for detecting the fluorescence passing through the confocal pinhole 13.

The light-stimulus optical system 3 includes a light-stimulus laser light source 15 for emitting laser light; a light modulator (wavelength-switching means, light modulating means) 16 for performing intensity modulation, on/off modulation, wavelength modulation, or the like of the laser light from the laser light source 15; a position adjusting unit (scanning unit) 17 for adjusting a two-dimensional position of the laser light modulated by the light modulator 16; a pupil-projection lens 18 for focusing the laser light adjusted in position by the position adjusting unit 17 to form an intermediate image; and an image-forming lens 19 for collecting the laser light forming the intermediate image and converting it to substantially collimated light.

The light modulator 16 is formed, for example, of an acousto-optic device.

By providing the scanning unit 17 for the light-stimulus optical system 3, the stimulus laser light can be irradiated at an arbitrary position independent of the observation position (position irradiated with observation laser light by the observation optical system 2).

In this embodiment, the position adjusting unit 17 of the light-stimulus optical system 3 has two electro-optical deflecting elements 21 and 22 that include electro-optical crystals 20 (see FIGS. 7A and 7B), in which refractive index gradients are induced by injecting electric current, and that are aligned one-behind-another in the optical-axis direction; a half-wave plate (polarization-direction rotation unit) 23 disposed between these electro-optical deflecting elements 21 and 22; and a control unit 25 for controlling a voltage applied to counter electrodes 24 (see FIGS. 7A and 7B) that sandwich the electro-optical crystals 20 of the electro-optical deflecting elements 21 and 22. The electro-optical crystals 20, for example, have a Kerr constant of $5 \times 10^{-15}$ m$^2$/V$^2$ or more and are formed of $KTa_{1-x}Nb_xO_3$. For example, the material disclosed in the following document can be applied to the electro-optical crystals 20: Nakamura et al., "Wide-angle, low-voltage electro-optic beam deflection based on space-charge-controlled mode of electrical conduction in $KTa_{1-x}Nb_xO_3$", Applied Physics Letters 89, 131115 (2006).

With these electro-optical crystals 20, the laser light can be scanned at a deflection angle θ according to the expression below:

$$\theta = -9/8 \times (L \times n^3 \times s_{ij}/d) \times (V/d)^2$$

Here, L is the length of each electro-optical crystal 20, n is the refractive index, $s_{ij}$ is the Kerr constant, d is the crystal thickness, and V is the voltage between the electrode.

The first electro-optical deflecting element 21 disposed adjacent to the rear side of the light modulator 16 is so configured that the polarization direction of the laser light emitted from the light modulator 16 matches a predetermined direction that is effective in deflecting the laser light by the electro-optical crystal 20 of the first electro-optical deflecting element 21. Because the electro-optical crystal 20 has polarization dependency, when the polarization direction of the incident laser light does not match the predetermined direction, the laser light cannot be effectively deflected even if a voltage is applied; however, there is no such problem in this embodiment.

The second electro-optical deflecting element 22 placed after the first electro-optical deflecting element 21, with the half-wave plate 23 sandwiched therebetween, is disposed so that the deflection direction of the laser light is rotated by 90° relative to the deflection direction of the laser light emitted from the first electro-optical deflecting element 21 disposed therebefore. By doing so, the incident laser light can be adjusted in position in one direction (for example, X-axis direction) by the first electro-optical deflecting element 21, and can be adjusted in position in another direction (for example, Y-axis direction) differing by 90° by operating the second electro-optical deflecting element 22. That is, the laser light modulated by the light modulator 16 can be two-dimensionally adjusted in position.

In this case, the position of the half-wave plate 23 disposed at the center of the two electro-optical deflecting elements 21 and 22 is configured to be disposed at an optically conjugate position with respect to the pupil position of the objective lens 5.

By receiving information about the wavelength of the laser light modulated by the light modulator 16, the control unit 25 controls the voltage applied to the electro-optical deflecting elements 21 and 22 according to the expression below.

$$V = (n_{ref}/n)^{3/2} \times V_{ref}$$

Here, $n_{ref}$ is the required refractive index for the laser light of a reference wavelength, $V_{ref}$ is the voltage at that time, n is the required refractive index for the laser light of a wavelength to be controlled, and V is the voltage at that time.

The operation of the laser microscope 1 according to this embodiment, having such a configuration, will be described below. To carry out fluorescence observation using the laser microscope 1 according to this embodiment, the laser light is emitted from the laser light source 6 of the observation optical system 2, is substantially collimated by the collimator lens 7, and is two-dimensionally scanned by the scanning unit 8 formed of galvanometer mirrors.

The laser light then irradiates the specimen A via the pupil-projection lens 9, the image-forming lens 10, the dichroic mirror 4, and the objective lens 5. By irradiating the specimen A with the laser light, a fluorescent material contained in the specimen A is excited and emits fluorescence. The emitted fluorescence is collected by the objective lens 5, returns via the dichroic mirror 4, the image-forming lens 10, the pupil-projection lens 9, and the scanning unit 8, and is split off from the optical path of the laser light by the dichroic mirror 11.

The split-off fluorescence is focused by the focusing lens 12, and then only the light passing through the confocal pinhole 13 is detected by the light detector 14. By associating and storing the intensity of the fluorescence detected by the light detector 14 with the angle of each of the galvanometer mirrors of the scanning unit 8 at the instant it is detected, it is possible to acquire a clear two-dimensional fluorescence image of the specimen A over the focal plane of the objective lens 5.

The laser light emitted from the laser light source 15 of the light-stimulus optical system 3 is subjected to wavelength selection, on/off modulation, or intensity modulation by the light modulator 16, is then two-dimensionally adjusted in position by the position adjusting unit 17, and irradiates the specimen A via the pupil-projection lens 18, the image-forming lens 19, the dichroic mirror 4, and the objective lens 5.

In this case, with the laser microscope 1 according to this embodiment, because the position is adjusted by the electro-optical deflecting elements 21 and 22 including the electro-optical crystals 20 in which refractive index gradients are induced by injecting electric current, it is possible to two-dimensionally move the light-stimulus laser light at a speed equal to video rate or more to irradiate a predetermined position on the specimen A. In addition, the electro-optical deflecting elements 21 and 22 can realize a sufficiently large deflection angle to ensure sufficient field number and numerical aperture, thus allowing an accurate light stimulus to be applied to the specimen A with laser light having sufficient intensity.

According to this embodiment, with both of the two electro-optical deflecting elements 21 and 22 disposed in series in the optical-axis direction, because the polarization direction of the laser light made incident on the electro-optical deflecting elements 21 and 22 matches the predetermined direction that is effective in deflection, the light-stimulus laser light can be efficiently deflected with a smaller change in voltage.

In addition, because the voltages applied to the electro-optical deflecting elements 21 and 22 are adjusted by operating the control unit 25, according to the wavelength selected by the light modulator 16, even when the wavelength of the laser light is switched, the light stimulus can be applied to the same position using laser light having different wavelengths without changing the spot position of the light-stimulus laser light on the specimen A.

Figure 2:
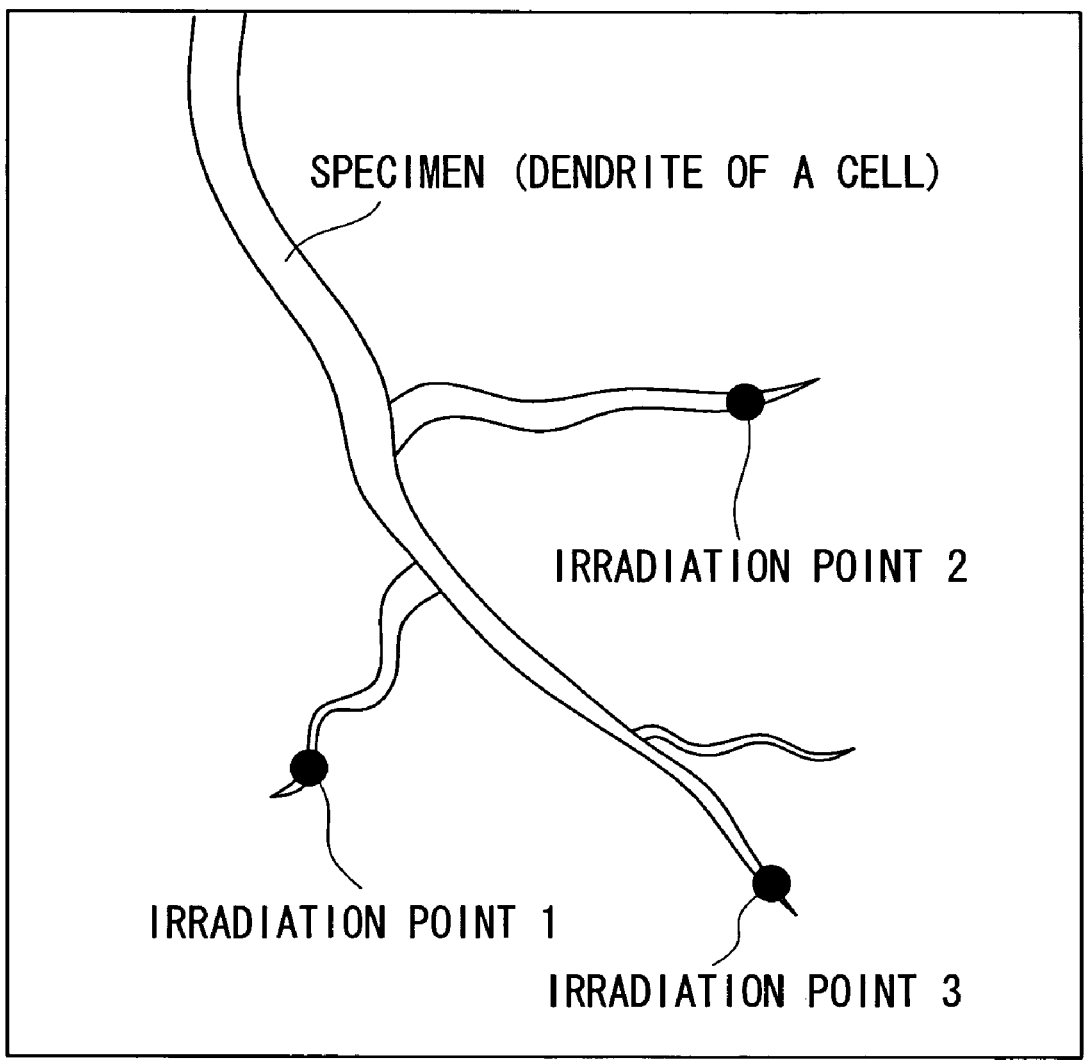
FIG. 2 is a diagram for explaining a case where light stimulus using a random scanning method is carried out on a dendrite of a cell serving as a specimen with the laser microscope shown in FIG. 1.

According to this embodiment, because the light modulator 16 is provided, by moving the light-stimulus laser light while turning it on/off by operating the light modulator 16, as shown in FIG. 2, it is possible to apply a quick accurate light stimulus using a so-called random scanning method, that is, irradiating the light-stimulus laser light at different and separate positions of the specimen A (for example, irradiation points 1 to 3 shown in the figure).

Because the electro-optical crystals 20 have wavelength dependency and the deflection angle differs if the wavelength differs, it is difficult to use them as a scanning unit for a standard laser confocal microscope. However, the light-stimulus optical system 3 is used for applying a light stimulus to the specimen A, and the fluorescence emitted from the specimen A does not have to be returned to the position adjusting unit 17; therefore, there is no such problem. Similarly, this also applies to a case where laser light for laser trapping is used instead of the light-stimulus laser light.

Figure 3:
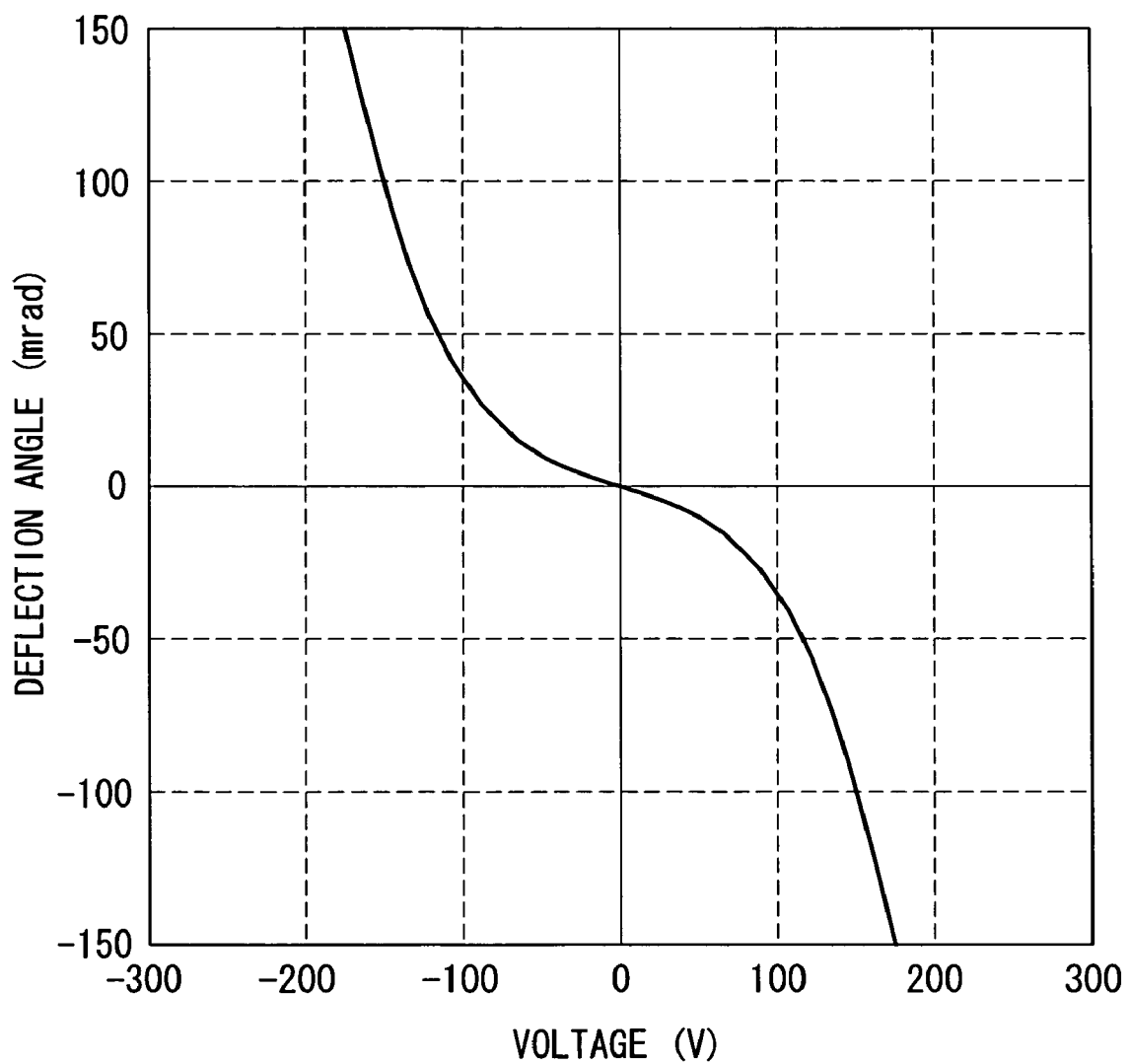
FIG. 3 is a graph showing a deflection angle versus voltage characteristic of an electro-optical crystal used for the laser microscope shown in FIG. 1.

In this embodiment, the voltage applied to these electro-optical crystals 20 is changed according to the wavelength of the laser light. In addition to this, the voltage applied to these electro-optical crystals 20 may be biased in one direction. The deflection angle versus the voltage of these electro-optical crystals 20 has a characteristic that varies as shown in FIG. 3. As shown in FIG. 3, the amount of change in deflection angle relative to the amount of change in the voltage increases as the voltage value becomes higher.

Accordingly, it is possible to obtain a larger deflection angle with a smaller change in voltage when the voltage applied to the electro-optical crystals 20 is biased in one direction, for example, in the plus direction, for example, when it is varied close to 150 V, rather than when it is varied close to 0 V. As a result, an advantage is afforded in that a compact power supply can be used as a driving power source.

This embodiment has been described in terms of an example of the laser microscope 1 in which the position adjusting unit 17 including the two electro-optical deflecting elements 21 and 22 is provided in the light-stimulus optical system 3. However, when using a raster scanning method, because a high-speed scanning unit and a low-speed scanning device are provided, the electro-optical deflecting element 21 (22) described above may be used as the high-speed scanning device, and an acousto-optic device or a galvanometer mirror may be used as the low-speed scanning device.

Figure 4:
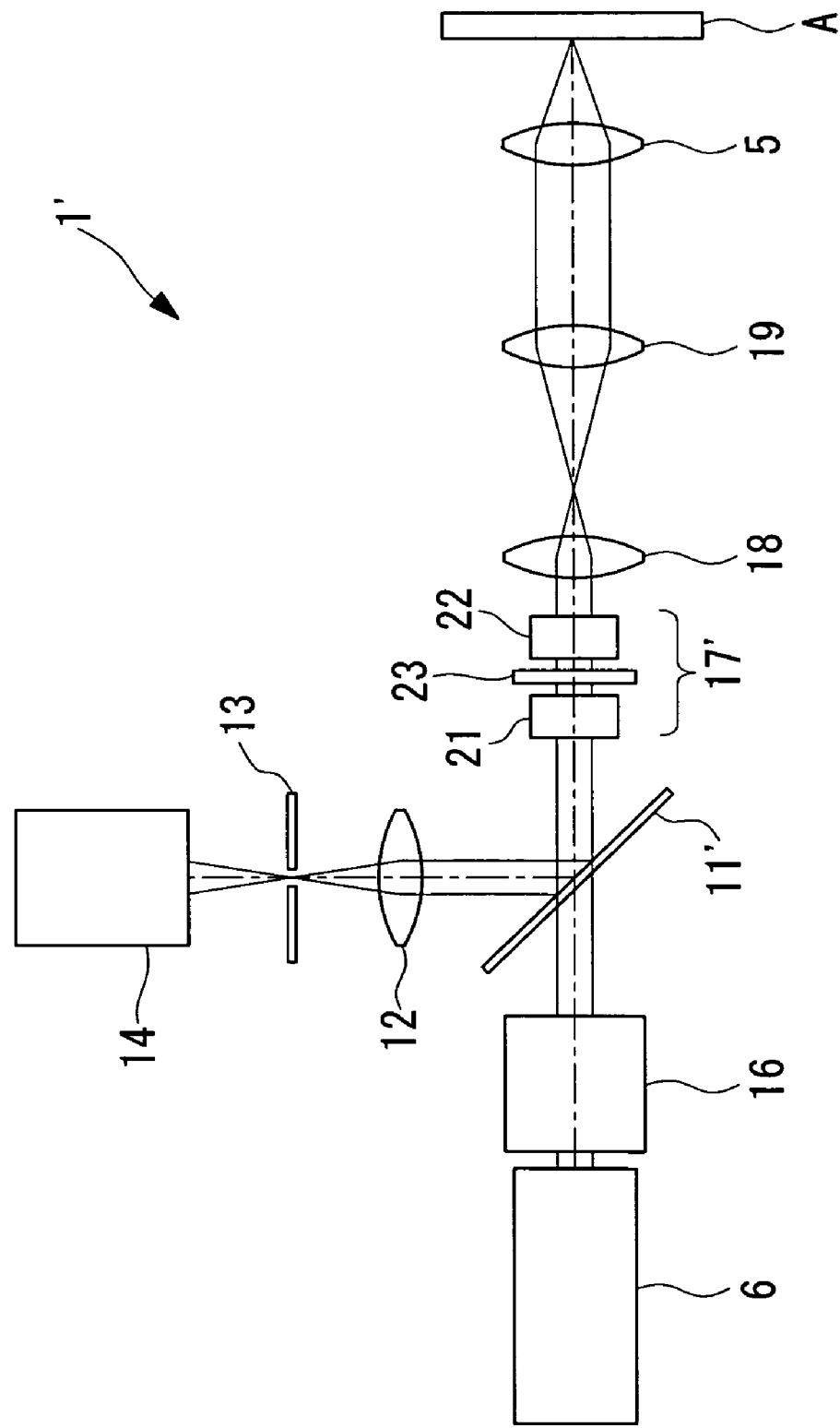
FIG. 4, which is a first modification of the laser microscope shown in FIG. 1, is a schematic diagram showing the overall configuration of the laser microscope for reflected-light observation.

As shown in FIG. 4, the two electro-optical deflecting elements 21 and 22 and the half-wave plate 23 may be used as a scanning unit 17' for a reflection-observation laser microscope 1'. When using the reflection-observation laser microscope 1', because the laser light for irradiating the specimen A and the laser light reflected from the specimen A have the same wavelength, the light can go and return along the same path through the electro-optical deflecting elements 21 and 22. For example, a half mirror may be used as splitting means 11' for splitting the light into the laser light and the observation light. Instead of the half mirror, a polarization beam splitter and a quarter-wave plate may be used.

Figure 5:
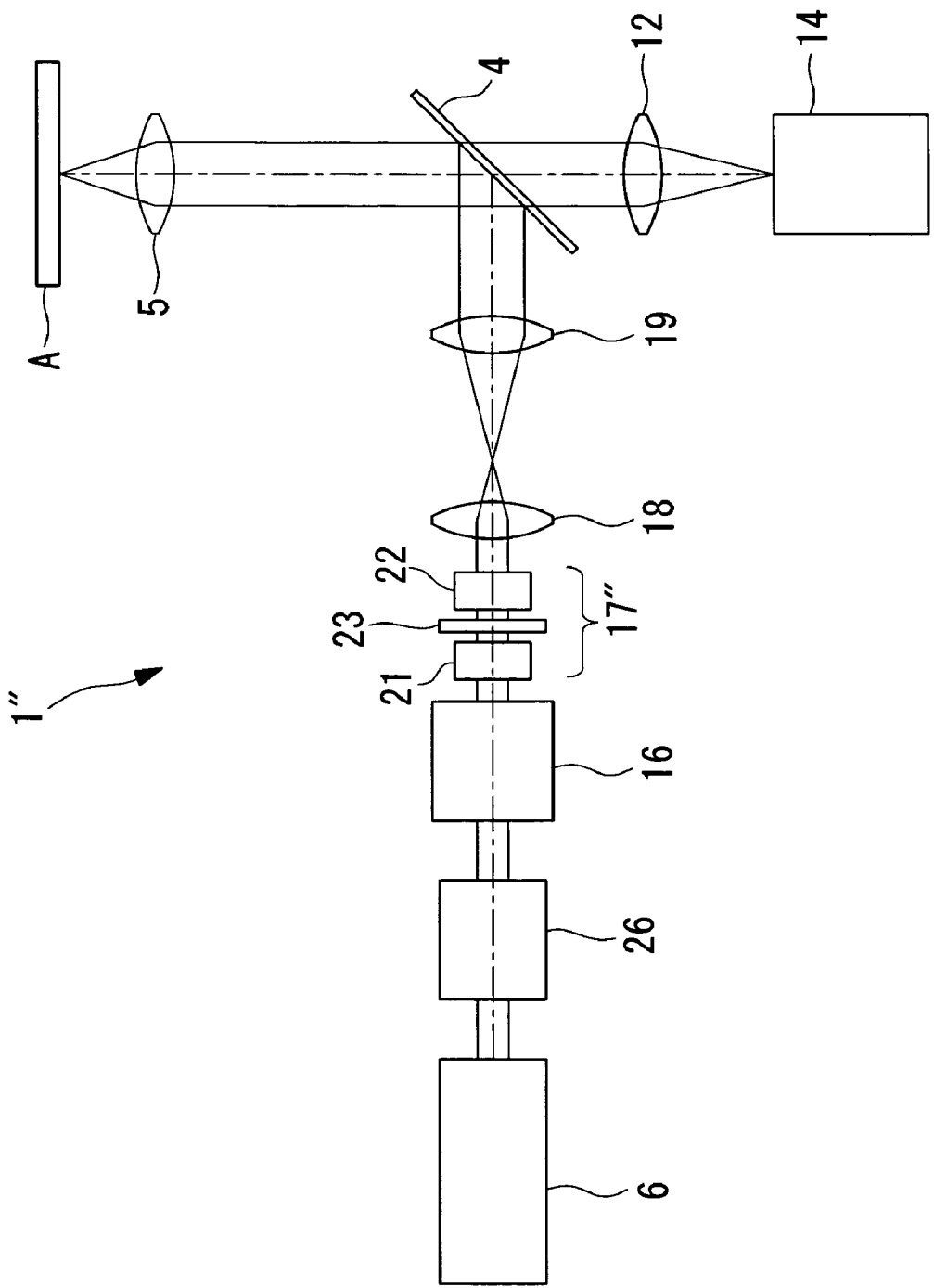
FIG. 5, which is a second modification of the laser microscope shown in FIG. 1, is a schematic diagram showing the overall configuration of a multiphoton-excitation laser microscope for multiphoton fluorescence observation.

As shown in FIG. 5, instead of the confocal laser microscope 1, the above-mentioned two electro-optical deflecting elements 21 and 22 and the half-wave plate 23 may be used as a scanning unit 17" for a multiphoton-excitation laser microscope 1". Reference numeral 26 in the figure is a dispersion compensator (pre-chirp compensator).

When using the multiphoton-excitation laser microscope 1", because fluorescence is produced only in the vicinity of a focal plane of the objective lens 5 by the multiphoton-excitation effect, a clear fluorescence image can be acquired by splitting off the fluorescence collected by the objective lens 5 before it returns to the scanning unit 17" and detecting it with the light detector 14. Accordingly, the electro-optical deflecting elements 21 and 22 having the above described wavelength dependency can be used for the scanning unit 17''; therefore, the fluorescence observation can be realized at a scanning speed equal to video rate or higher, while ensuring sufficient field number and numerical aperture.

Figure 6:
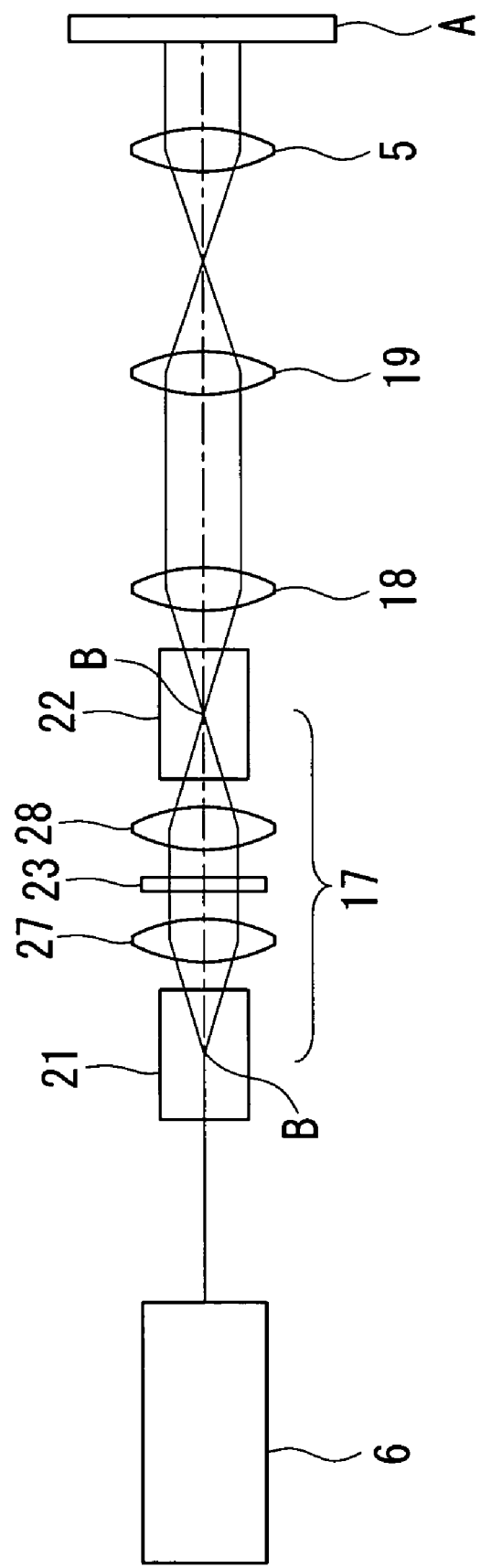
FIG. 6, which is a third modification of the laser microscope shown in FIG. 1, is a schematic diagram showing a case where there is a relay lens for relaying a pupil position of an objective lens.

In this embodiment, the central position of the two electro-optical deflecting elements 21 and 22 arranged in series along the optical axis is disposed at an optically conjugate position with respect to the pupil position of the objective lens 5. Instead of this, as shown in FIG. 6, by disposing the relay lenses 27 and 28 on either side of the half-wave plate 23, a position that is a deflection center B of the two electro-optical deflecting elements 21 and 22 may be set to be an optically conjugate position with respect to the pupil position of the objective lens 5. In this way, even when the laser light is scanned by the electro-optical deflecting elements 21 and 22, it is possible to minimize the movement of the laser light at the pupil position of the objective lens 5. This is particularly effective in the case where the longitudinal length in the optical axis direction of the electro-optical deflecting elements 21 and 22 becomes large.

Figure 7A:
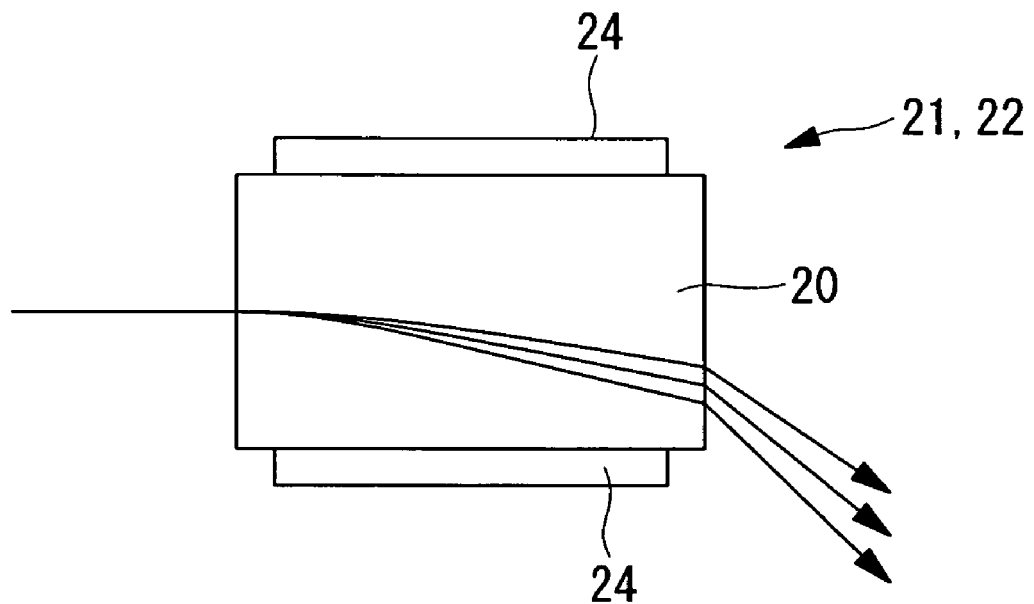
FIG. 7A is a diagram for explaining an electro-optical deflecting element used for the laser microscope shown in FIG. 1.
Figure 7B:
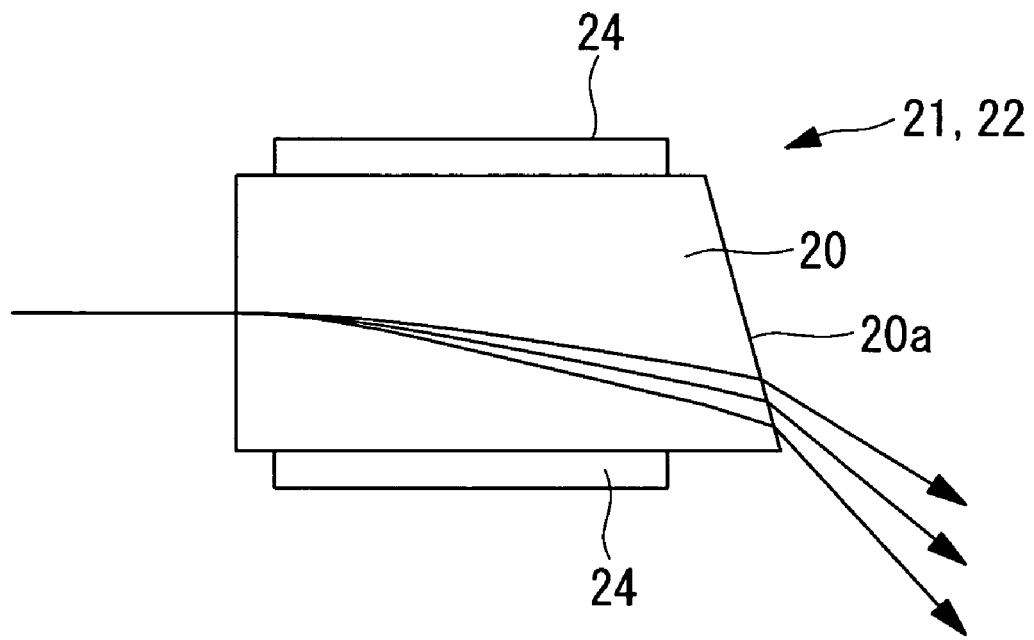
FIG. 7B is a diagram for explaining a modification of the electro-optical deflecting element used for the laser microscope shown in FIG. 1.

As shown in FIGS. 7A and 7B, emission end faces 20a of the electro-optical crystals 20 may be inclined in the directions opposite to the deflection directions of the laser light. In this way, it is possible to increase the emission angle of the laser light emitted from the emission end faces 20a of the electro-optical crystals 20, thus allowing a larger deflection angle to be obtained.

Figure 8A:
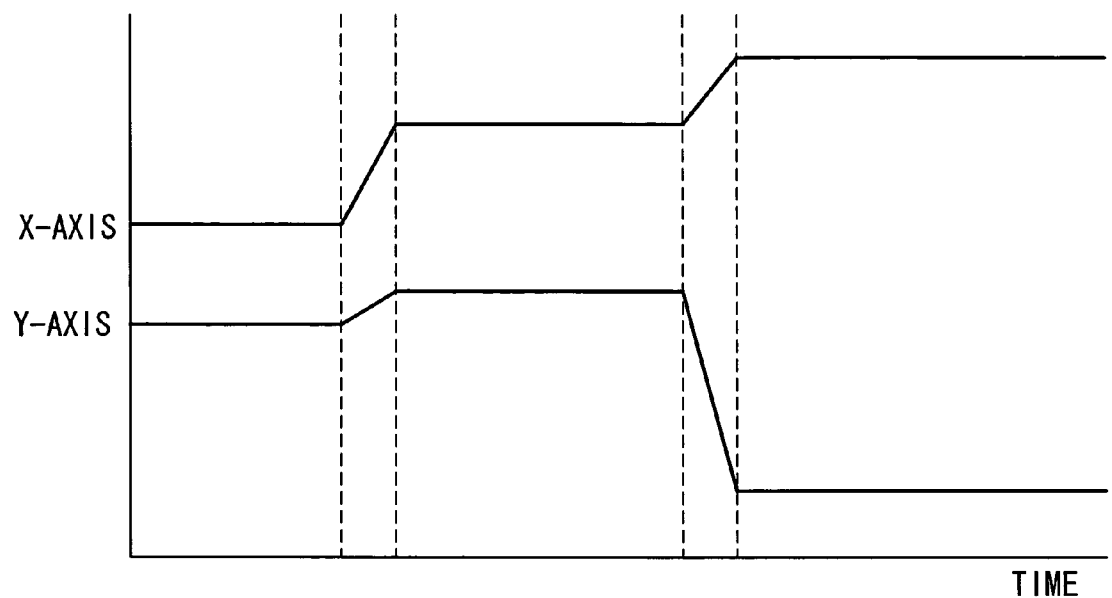
FIGS. 8A, 8B, and 8C are diagrams showing an example of voltage values applied to the electro-optical deflecting elements and a temporal change of radiation intensity to the specimen when a spot position of laser light is shifted with the laser microscope shown in FIG. 1 using the random scanning method.

In this embodiment, the light modulator 16 is provided at the front side of the electro-optical deflecting element 21 to turn the laser light on/off or modulate its intensity. Instead of this, as shown in FIGS. 8A and 8C, when the laser light is pulsed laser light, the spot position of the laser light may be shifted by varying the voltage applied to the electro-optical deflecting elements 21 and 22 between pulses P, without providing the light modulator 16.

In this way, the spot of laser light can be moved to a separate position on the specimen A without trailing the spot.

Figure 8B:
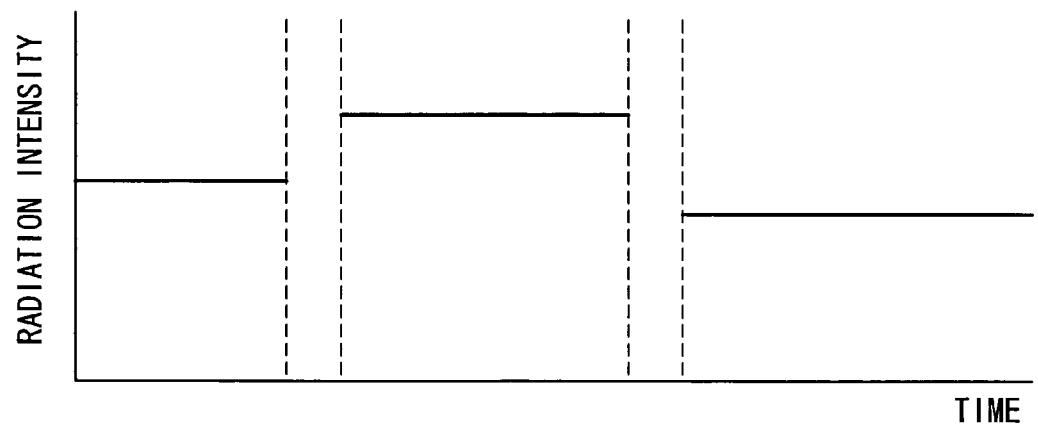
Figure 8C:
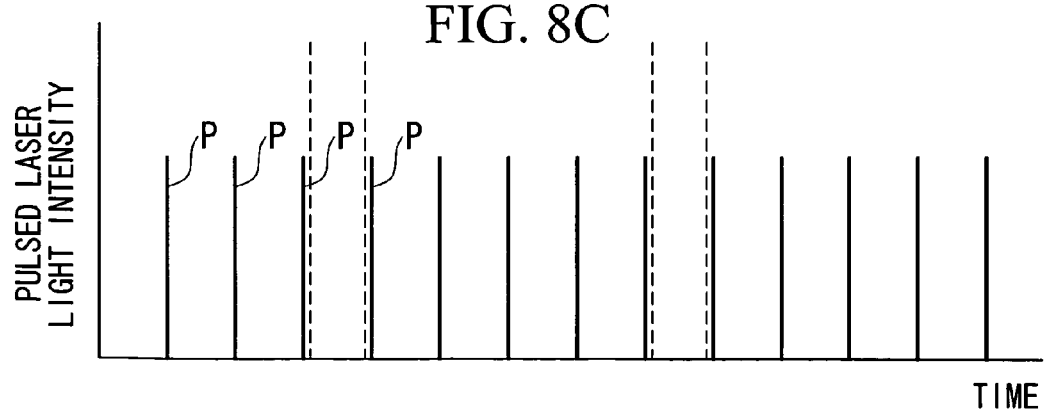

As shown in FIG. 8B, the radiation intensity of the laser light to the specimen A may be adjusted by adjusting an output of the laser light source 6. In this case, as shown in FIG. 8C, by switching the output of the laser light source 6 between the pulses P, it is possible to irradiate the specimen A with the laser light having a constant intensity at each of the spot positions of the laser light moved by the scanning unit 17.

Figure 9A:
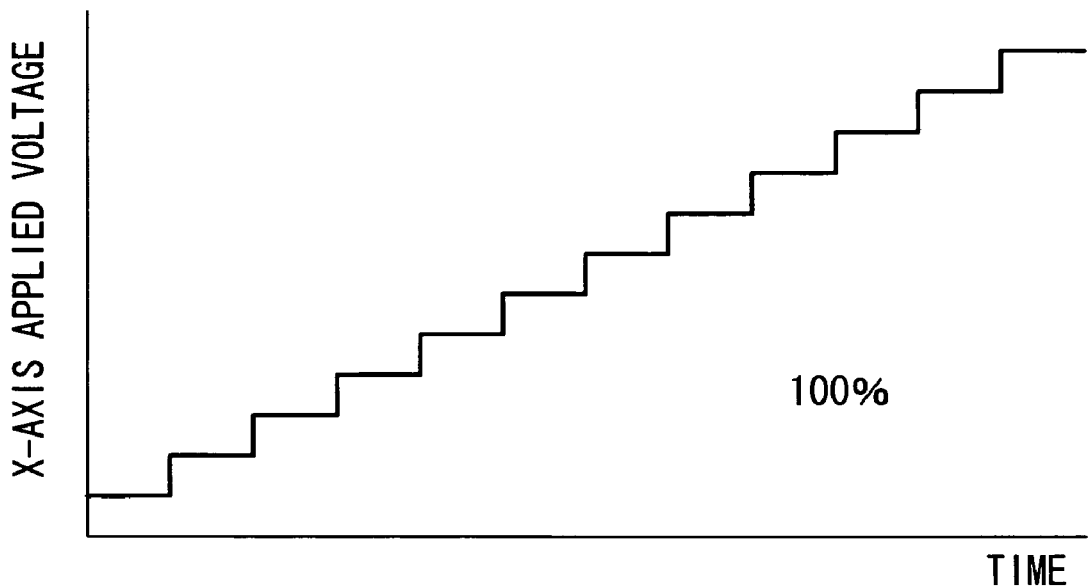
FIGS. 9A and 9B are diagrams explaining a method of adjusting the intensity of the laser light irradiating the specimen without using a light modulator in the laser microscope shown in FIG. 1.
Figure 9B:
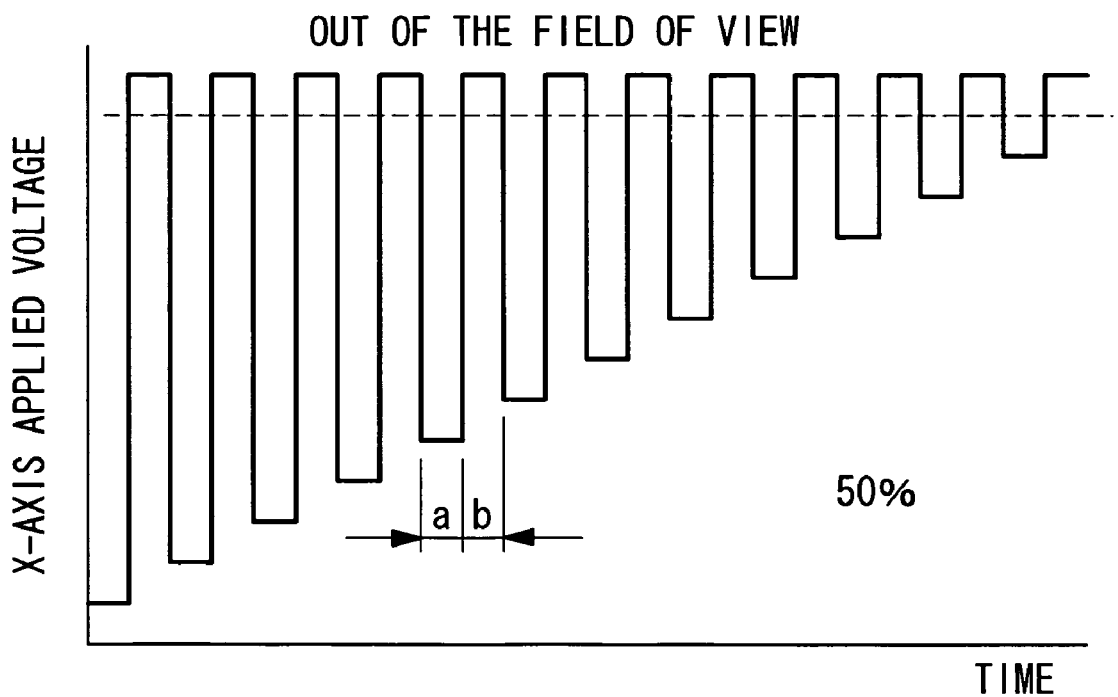

As shown in FIGS. 9A and 9B, when pulsed laser light is scanned on the specimen A, the radiation intensity to the specimen A may be adjusted, for example, by switching the voltage applied to one of the electro-optical deflecting elements, namely, the element 21 (22). For example, as shown in FIG. 9B, by switching the voltage applied to one of the electro-optical deflecting elements, for example, the X-axis deflecting element 21, the spot of pulsed laser light is moved out of the field of view (outside of the target irradiation position), and by adjusting the ratio between the irradiation time a to the target irradiation position corresponding to each pixel and the irradiation time b to move outside of the target irradiation position (50% in FIG. 9B), the radiation intensity to the specimen A can be adjusted.

In this case, the position change from the target irradiation position to outside of the target irradiation position is carried out between the pulses P. The radiation intensity can thus be adjusted without trailing the spot of the laser light on the specimen A.

Now, an effect obtained by using a refractive index distribution in the electro-optical crystals 20 due a space-charge control mode of the electro-optical crystals 20 (hereinafter, referred to as a space-charge control-mode electrooptic effect) will be described.

The pupil diameter d of the objective lens 5 is given by:

$$d = 2NA \times F_{OB} = 2NA \times F_{TL}/\beta \quad (1)$$

Here, $F_{TL}$ is the focal length of the image-forming lens 19, $F_{OB}$ is the focal length of the objective lens 5, $\beta$ is the magnification of the objective lens 5, and NA is the numerical aperture of the objective lens 5.

The condition for the beam of laser light to fill the pupil of the objective lens 5 is:

$$d = F_{TL}/F_{PL} \times D \quad (2)$$

Here, $F_{PL}$ is the focal length of the pupil-projection lens 18, and D is the beam diameter of the laser light incident on the electro-optical deflecting elements 21 and 22.

The relationship between one-side deflection angle θ due to the electro-optical crystal 20 and the field number N is:

$$F_{PL} \times 2 \times \sin\theta = N \quad (3)$$

From expressions (1) to (3) above, we have:

$$D \times \sin\theta = NA \times N/\beta \quad (4)$$

In the scanning laser microscope 1, resolution is the most important factor. That is, the objective lens 5 must have a large numerical aperture NA. One generally known approach for obtaining high resolution is to use an oil-immersion objective lens having a magnification of 60× as the objective lens 5, which has a field of view suitable for cells. In this embodiment, it is necessary to fill the pupil of the oil-immersion objective lens 5 having a magnification of 60× to obtain a field number of 18 mm. Namely, substituting NA=1.35, N=18, and β=60 into expression (4), it is necessary to satisfy expression (5) below:

$$\sin\theta \times D > 0.41 \quad (5)$$

When using the electro-optical deflecting elements 21 and 22 according to this embodiment, and when the crystal thickness is dc, the voltage between the electrodes is V, the crystal length is L, the incident beam diameter is D, and the Kerr constant is $S_{ij}$, the deflection angle $\theta_{eoeff}$ due to the space-charge control-mode electrooptic effect is ±7.8°, that is, 15.6°, when, for example, dc is 2 mm, V is ±2000 V, L is 4.1 mm, and $S_{ij}$ is $5 \times 10^{-15}$ m²/V².

In this case, when the beam diameter D is equal to 1.4 mm or below, even when the laser light beam bends, it is not refracted at an exit surface of the crystal.

In addition, at the exit surface of the electro-optical crystal 20, the laser light is deflected towards a wider angle according to Snell's law. When the refractive index of the electro-optical crystal 20 is 2.28, the full deflection angle $\theta_{eo}$ of the electro-optical deflecting elements 21 and 22 is ±18.1° at the exit.

In order to obtain a sufficient field of view, when the incident beam diameter D fills the pupil of the objective lens 5, based on expression (5) above, the full deflection angle $\theta_{eo}$ should be ±17.9° or more when the beam diameter D is 1.4 mm. Accordingly, under the above conditions (the Kerr constant $S_{ij}$, which is a characteristic of the electro-optical crystals 20 themselves, is $5 \times 10^{-15}$ m²/V² or above), it is possible to scan while ensuring a sufficient field of view when sufficiently filling the pupil of the objective lens 5.

In contrast, when the Kerr constant $S_{ij}$ is equal to $5 \times 10^{-15}$ m²/V² or less, the field of view is limited or the resolution is deteriorated; therefore, there is a problem in that sufficient performance of the scanning laser microscope 1 cannot be obtained.

According to these calculation examples, the Kerr constant $S_{ij}$ is preferably equal to $5\times10^{-15}$ m$^2$/V$^2$ or more for the electro-optical crystals 20 of the electro-optical deflecting elements 21 and 22 used as the scanning unit of the scanning laser microscope 1.

What is claimed is:

1. A laser microscope comprising:
    a laser light source;
    a scanning unit configured to scan a specimen with laser light emitted from the laser light source; and
    an objective lens configured to focus the laser light scanned by the scanning unit on the specimen,
    wherein the scanning unit is provided with an electro-optical deflecting element including an electro-optical crystal in which a refractive index gradient is induced in an injection direction of electric current by injecting the electric current, and
    wherein the laser light is made incident between counter electrodes for injecting the electric current to the electro-optical crystal provided therebetween so that the laser light is deflected in the injection direction of the electric current, by the scanning unit.

2. A laser microscope according to claim 1, wherein the electro-optical deflecting element has a Kerr constant equal to $5\times10^{-15}$ m$^2$/V$^2$ or more.

3. A laser microscope according to claim 1, wherein the electro-optical crystal [[is]] comprises KTa$_{1-x}$Nb$_x$O$_3$.

4. A laser microscope according to claim 1, wherein the laser light is made incident on the electro-optical deflecting element, which has polarization dependency, so that a polarization direction of the laser light matches a predetermined direction that causes deflection of the laser light in accordance with the polarization dependency of the electro-optical deflecting element, by the electro-optical deflecting element.

5. A laser microscope according to claim 1, wherein the laser light comprises one of light-stimulus laser light for the specimen and laser light for laser trapping.

6. A laser microscope according to claim 1, wherein the laser light is used for observation of reflected light at the specimen.

7. A laser microscope according to claim 1, wherein the laser light comprises ultrashort pulsed laser light producing a multiphoton-excitation effect in the specimen.

8. A laser microscope according to claim 7, further comprising a control unit configured to switch a deflection direction of the laser light by the electro-optical deflecting element and to adjust an irradiation time of the laser light to a target irradiation position and an irradiation time of the laser light to outside of the target irradiation position.

9. A laser microscope according to claim 4, wherein the scanning unit includes two of the electro-optical deflecting elements arranged in an optical-axis direction so that scanning directions thereof differ by 90°; and
    wherein a polarization rotation unit configured to rotate the polarization direction of the laser light by 90° is provided between the electro-optical deflecting elements.

10. A laser microscope according to claim 9, wherein the polarization rotation unit comprises an achromatic half-wave plate.

11. A laser microscope according to claim 9, wherein the two electro-optical deflecting elements are disposed close to each other in the optical-axis direction.

12. A laser microscope according to claim 9, wherein a conjugate position with respect to a pupil of the objective lens exists between the two electro-optical deflecting elements.

13. A laser microscope according to claim 9, wherein relay lenses, which relay the pupil position of the objective lens to a deflection center position of the two electro-optical deflecting elements, are disposed between the two electro-optical deflecting elements.

14. A laser microscope according to claim 1, wherein the scanning unit is formed by arranging, in an optical axis direction, the electro-optical deflecting element and another scanning device such that a scanning direction thereof differs by 90° relative to a deflection direction of the electro-optical deflecting element.

15. A laser microscope according to claim 14, wherein said another scanning device comprises one of a galvanometer mirror and an acousto-optic deflecting device.

16. A laser microscope according to claim 1, further comprising:
    a wavelength switching unit configured to switch a wavelength of the laser light emitted from the laser light source; and
    a control unit configured to adjust a voltage applied to the electro-optical deflecting element according to the wavelength switched by the wavelength switching unit.

17. A laser microscope according to claim 16, wherein the control unit applies, to the electro-optical deflecting element, a voltage according to the following expression:

$$V=(n_{ref}/n)^{3/2}\times V_{ref}$$

where $n_{ref}$ is a required refractive index for laser light of a reference wavelength, $V_{ref}$ is a voltage corresponding to the required refractive index for the laser light of the reference wavelength, n is a required refractive index for laser light of a wavelength to be controlled, and V is a voltage corresponding to the required refractive index for the laser light of the wavelength to be controlled.

18. A laser microscope according to claim 1, further comprising:
    a control unit configured to control a deflection direction of the laser light from the electro-optical deflecting element,
    wherein the control unit controls the electro-optical deflecting element with a voltage biased in one direction.

19. A laser microscope according to claim 1, further comprising a light modulating unit configured to modulate the laser light.

20. A control method for a laser microscope in which laser light is scanned, on a specimen, by an electro-optical deflecting element including an electro-optical crystal in which a refractive index gradient is induced in an injection direction of electric current by injecting the electric current, the control method comprising:
    changing a voltage applied to the electro-optical deflecting element according to a wavelength of laser light incident on the electro-optical deflecting element; and
    deflecting the laser light in the injection direction of the electric current.

21. A control method for a laser microscope according to claim 20, wherein a voltage according to the following expression is applied to the electro-optical deflecting element:

$$V=(n_{ref}/n)^{3/2}\times V_{ref}$$

where $n_{ref}$ is a required refractive index for laser light of a reference wavelength, $V_{ref}$ is a voltage corresponding to the required refractive index for the laser light of the reference wavelength, n is a required refractive index for laser light of a wavelength to be controlled, and V is a voltage corresponding to the required refractive index for the laser light of the wavelength to be controlled.

* * * * *